United States Patent [19]

Camossi

[11] 4,397,069
[45] Aug. 9, 1983

[54] DEVICE AND PROCESS FOR THE MANUFACTURE OF VIBRATION-DAMPING AND SHOCKPROOF MOUNTINGS INCORPORATING AT LEAST ONE HELICALLY ARRANGED METAL CABLE AND MOUNTING THEREBY OBTAINED

[76] Inventor: Carlo Camossi, Via C. Bartoli, 22, 28024 - Gozzano (Novara), Italy

[21] Appl. No.: 159,195

[22] Filed: Jun. 13, 1980

[30] Foreign Application Priority Data

Jun. 20, 1979 [IT] Italy .................. 23722 A/79

[51] Int. Cl.$^3$ .................. B21F 35/00; B23P 13/00
[52] U.S. Cl. .................. 29/173; 29/436; 72/142; 72/144; 72/147; 72/148; 140/92.2; 242/7.13; 242/72 R; 248/570; 248/636; 267/61 R; 267/169; 188/380
[58] Field of Search .......... 188/380; 267/61 R, 61 S, 267/60, 136, 148, 166, 167, 169, 180; 248/620, 626, 627, 636, 638, 568, 570; 29/163.5 CW, 173, 526 R, 436, 456; 72/144, 146, 143, 147, 142, 148; 242/72 R, 110, 7.09, 7.11, 7.13; 140/92.2

[56] References Cited

U.S. PATENT DOCUMENTS

| | | | |
|---|---|---|---|
| 716,555 | 12/1902 | King | 72/144 X |
| 1,394,454 | 10/1921 | Van Doorn | 29/173 X |
| 2,234,504 | 3/1941 | Robinson et al. | 267/166 X |
| 2,261,200 | 11/1941 | Wilson | 140/92.2 |
| 2,268,125 | 12/1941 | Hash et al. | 72/143 X |
| 2,341,957 | 2/1944 | Storey | 242/72 |
| 2,431,928 | 12/1947 | Garreau | 267/61 R |
| 2,657,874 | 11/1953 | Taylor | 242/72 |
| 3,121,538 | 2/1964 | Klingensmith et al. | 72/142 X |
| 3,166,104 | 1/1965 | Foley, Jr. et al. | 242/7.09 X |

FOREIGN PATENT DOCUMENTS

1129810 10/1968 United Kingdom ........... 248/636

*Primary Examiner*—George E. A. Halvosa
*Attorney, Agent, or Firm*—Sixbey, Friedman & Leedom

[57] ABSTRACT

The device and related process for the manufacture of vibration-damping and shockproof mountings formed of metal cable spirals comprise a generator of low speed rotational motion; a spindle formed of at least two portions, parallel longitudinally developing and adjustably matchable to each other, having outer surfaces corresponding to those of the cable spirals to be formed, and at least two planar zones along two diametrically opposite generatrices, each of such zones for the bearing thereon of one of the terminal forming bars connecting with the bar, the pairs of bars having the matching surfaces provided with semicylindrical connecting seats for accommodating and firmly tightening for a short length the cable spirals, but without any distortion to the elementary wires thereof; a braking system for holding the in-coming cable under tension, slidable on two parallel shafts, to supply the spiral winding on the spindle body; a clamp for securing the cable to be wound up at the operation start and a spacer downstream of the formed spirals on the spindle, the loosening of which allows the finished vibration-damping and shockproof mounting to be released. The present device and process are used for mechanically manufacturing vibration-damping and shockproof mountings particularly employed for the protection of delicate equipments subjected to very high shocks and vibrations during operation.

4 Claims, 11 Drawing Figures

DEVICE AND PROCESS FOR THE MANUFACTURE OF VIBRATION-DAMPING AND SHOCKPROOF MOUNTINGS INCORPORATING AT LEAST ONE HELICALLY ARRANGED METAL CABLE AND MOUNTING THEREBY OBTAINED

The special features of metal cable, vibration-damping and shockproof mountings in the linear, annular, toroidal, coil and helical forms thereof are well known. Particularly, those designs incorporating helically arranged metal cables have a significant use and practicality because of allowing a wide variation in rigidity as the diameter of the metal cable and size of the helix or spiral comprising said cable varies. Moreover, even under the same diameter for the metal cable, by varying the size, pitch or number of turns of the helix or spiral, the coefficient of rigidity in the mounting can be varied. This on the ground of the principle, which is at the basis of the concept of vibration damping by a metal cable mounting, or that by passing from one location to another of the mounting the stresses would be attenuated due to friction between the individual strands and wires forming the cable. Under the same frequency, and with amplitude and acceleration known, the output will accordingly be of lower amplitude and acceleration.

Therefore, an actual damping will be provided, apart from the exaltation at the resonance frequency, the amplification coefficient or factor of which is in any case very low. Additionally, as far as shocks are concerned, a substantial space must be available for the oscillation of the metal cable mounting, which is arranged to take up the positive and negative dynamic component (deflection and stretching) as caused by the first impact; the following oscillations are dampened by the known friction effect.

When the helix or spiral is single, and accordingly arranged in a single right-hand or left-hand direction, a metal cable mounting would tend to deflect in either direction, depending on the slope direction of the helix or spiral turns. In order to overcome this disadvantage in the field of practical applications for such mountings, the invention has provided to couple two spirals wound up in opposite directions on a same mounting, or to assemble two coupled mountings, the second of which carries a spiral having a winding direction opposite to that for the turns of the first, or to provide a mounting carrying an equal number of turns arranged in opposite direction to the others.

This being previously stated and taking into account the changeability of the available parameters, that is to say the cable diameter, helix or spiral size, number of turns, etc., a substantial range can be provided of metal cable mountings capable of meeting those requirements as imposed by the problems in the dampening of vibrations and shocks both for small masses as well as much longer masses with weights, or requiring the use of metal cables of high diameter and accordingly of large size mountings.

On the ground of the above disclosed formal concepts, it is the object of the present invention to provide a device for the manufacture of a vibration-damping and shockproof mounting as above described, in which the cable is secured as a helix or spiral to supporting bars tangentially arranged to the turns.

By way of unrestrictive example, the accompanying drawings schematically show some embodiments of the inventive device allowing the winding up and simultaneous fastening of the turns to the mounting according to the predetermined design for the formation of the precalculated mounting.

Figure 2:
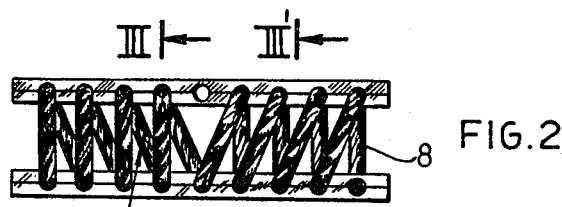
FIG. 2 is a side view of a mounting, wherein the spiral is in the first portion wound up according to one direction, and in the adjoining portion in the opposite direction.
Figure 3:
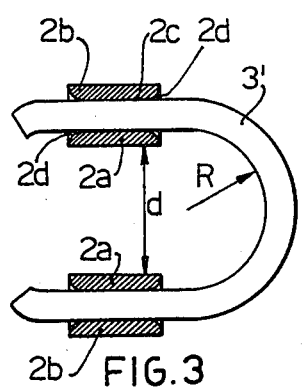
FIG. 3 is a sectional view of the mounting taken along lines III—III of FIG. 2.
Figure 3:
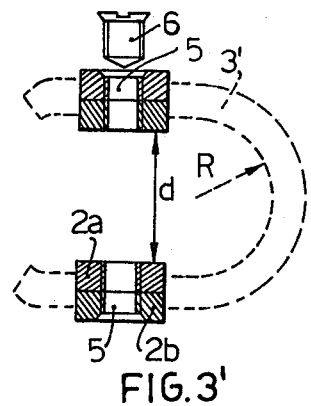
Figure 4:
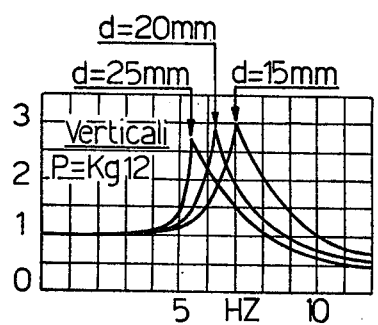
Figure 5:
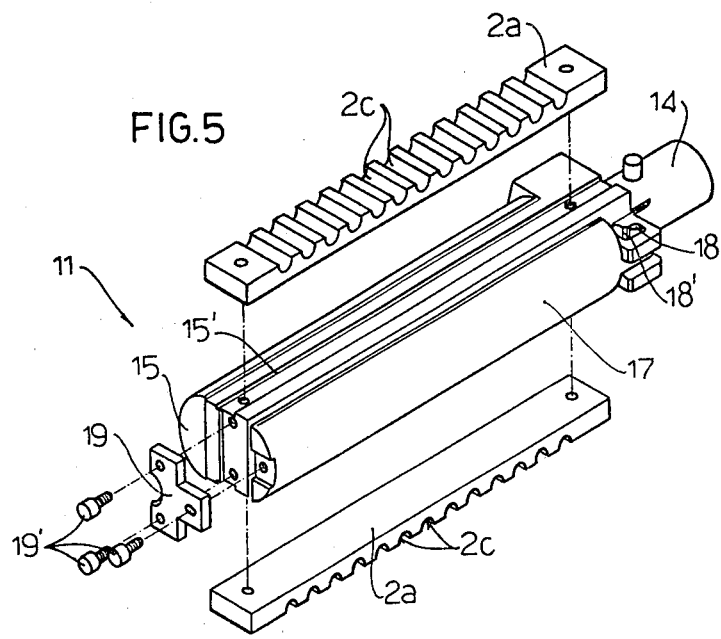
Figure 5:
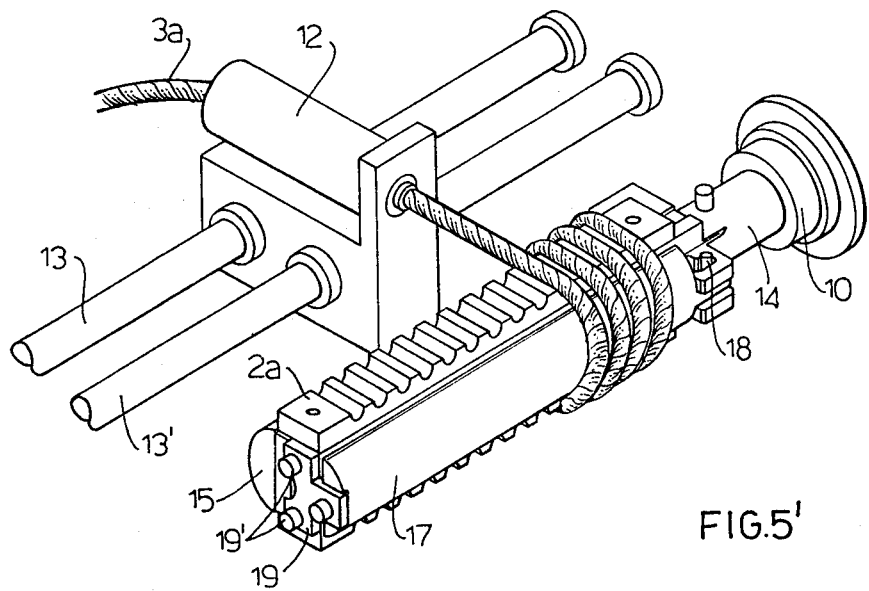
Figure 6:
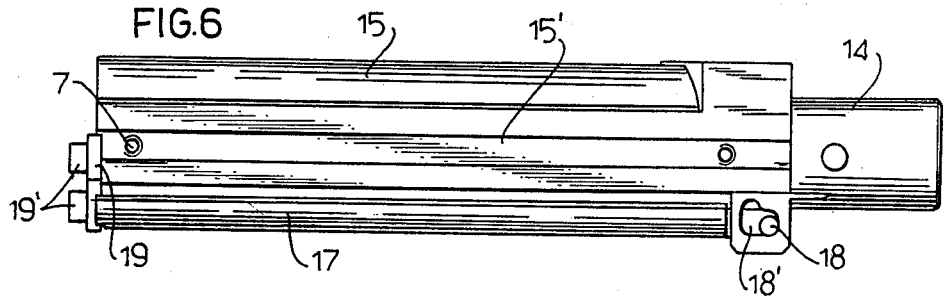
Figure 7:
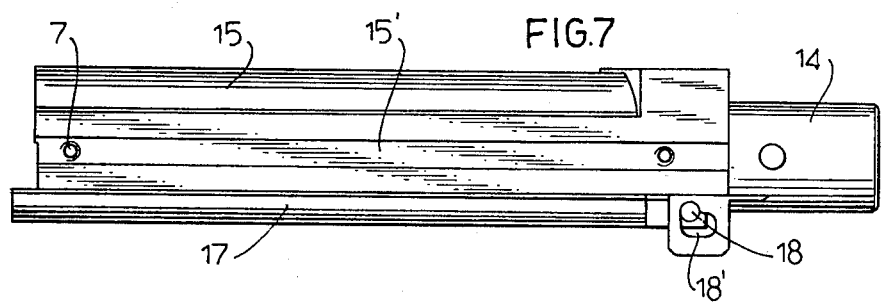
Figure 8:
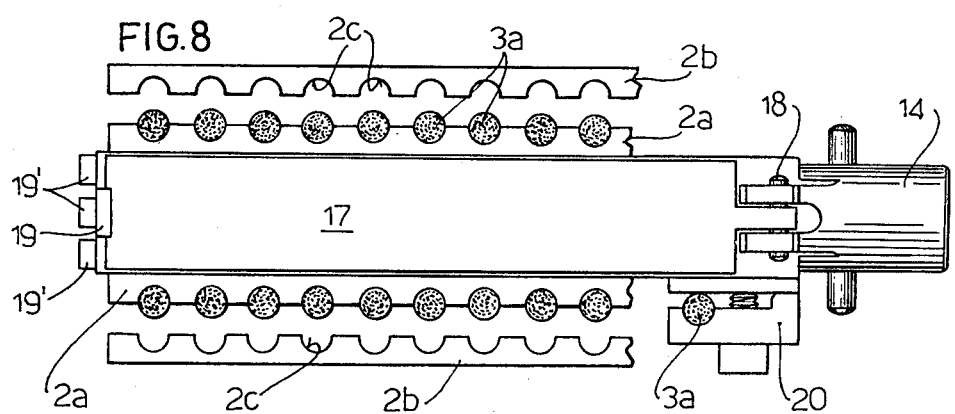
Figure 9:
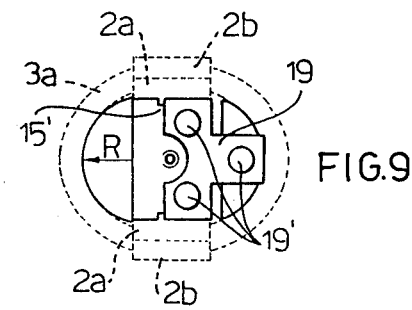

FIG. 3' is a sectional view of the mounting taken along line III'—III' of FIG. 2;

FIG. 4 is a pictorial diagram of the variation in transmissability versus the distance d as shown in FIG. 3';

FIG. 5 is an exploded perspective view of the present invention;

FIG. 5' is a perspective view of a device for forming the spiral of metal cable directly on the mounting, according to the process of the present invention;

FIG. 6 is an enlarged side view of the spindle, as divided into two portions 15 and 17, for the formation of the vibration-damping mounting;

FIG. 7 is a side view of the spindle 15, 17 of FIG. 6 with portion 17 upward displaced to aid in disassembling of the finished mounting;

FIG. 8 is a detail view with the cable anchoring device feeding the forming turns and with the two pairs of bars at exploded position; and FIG. 9 is an end view of the same spindle of FIG. 6 with the clamp/release device for the movable portion of the spindle.

Figure 1:
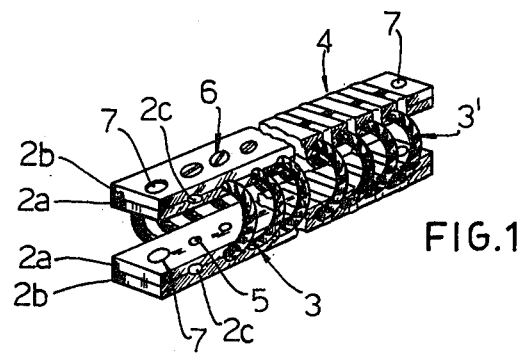
FIG. 1 is a perspective view showing a helical mounting, in which the turns are secured in two equivalent but distinct modes.

Particularly referring to FIG. 1, it will be seen that a vibration-damping and shockproof mounting comprises at least two pairs of metal or plastic material bars 2a and 2b, each of such bars having on one face a series of notches 2c (FIGS. 1, 5 and 8), each of which will have to be clamped and immobilized, but without any possibility of pinchings or distortion by deflection of the elementary wirres forming said cable 3. The free lengths 3' of the cable turns (FIGS. 1, 3 and 3') are of substantial helical configuration, while said bars 2a and 2b clamp therebetween in said notches 2c a length of cable 3 substantially parallel by means of conventional fastening systems, such as screws 6 (FIGS. 1 and 3') tightened within holes 5 drilled in said bars 2a and 2b, or clips 4, as shown at the right of FIG. 1. The center to center between notches 2c will define the pitch for turns 3 and 3' and is precalculated.

Cable 3 is of the multistrand type, and preferably the strands are helically arranged and each of the strands are formed in turn of individual elementary wires, or minor strands also helically wound up. Cables of this type are characterized by a high inner friction between one wire and the other, so as to dissipate the shock or vibration energy to a high degree.

Any type of cable can be used according to the invention and the diameters thereof could be different, but still precalculated. Preferably, said cable 3 or 3' is made of metal, particularly galvanized steel commonly referred to as AISI304 and/or stainless steel. As shown in FIG. 1, the pairs of bars 2a and 2b have at each end a hole 7 for facilitating the fastening of the pair of bars 2a and 2b forming each mounting, such as a hole allowing the passage of bolts, screws or the like. Said holes 7 may also be more than two for each pair of bars.

FIG. 2 is a side view of the mounting shown in FIG. 1, from which it will be particularly seen that the cable may be arranged with right-hand helix 8 or left-hand helix 8' for symmetrically operating during dampening process. Thus, this expedient would serve to balance the resilient mounting during the working step, as it would tend where the helix or spiral were arranged in only one direction to deflect according to the inclination of the helix or spiral turns.

FIGS. 3 and 3' are respectively a sectional view III—III of the mounting shown in FIG. 1 and a sectional view III'—III' of the same mounting in order to particularly show the fastening seats 2c, provided by the pair of bars 2a and 2b, with the ends 2d thereof countersunk and rounded to clamp the cable turns without subjecting the latter to shearing stresses or in any case without subjecting them to chokings or pinchings either during clamping of the bars, or during dampening operation of the mounting. There are also particularly shown the threaded holes 5 (see FIG. 3') for thoroughly clamping the two bars making up each pair constituting one half of the mounting. The end holes 7, distinctly shown in FIG. 1, also serve to secure when manufacturing and assembling the two pairs of bars 2a and 2b to the frame of the machine tool as the turns are being formed. The radius of curvature R for the cable shown in FIG. 3' is liable to variation in connection with the design calculation of the damping mounting and, under the same diameter of the cable, determines the distance or spacing d between the pairs of bars, establishing the required deflection of the mounting to take up the dynamic camber caused by the shock and/or vibration. Under the same diameter of the cable, less is said radius of curvature R and smaller are the helix or spiral turns and accordingly less is the distance or spacing d between the two opposite pairs of bars clamping such a cable, and as a result, the rigidity K of said mounting will increase. On the other hand, still under the same diameter of the cable, by increasing the radius of curvature R of the cable, the helix or spiral would be larger and accordingly larger would be said distance or spacing d with a resulting lower rigidity of the mounting.

Such an increased distance or spacing d between said bars clamping the cable therebetween allows to augment the possibility of taking up the dynamic displacement in case of shock, under the same static load, with a larger deflection of the mounting due to an increased input acceleration.

The above described mountings are mounted between the equipment to be insulated or dampened and its base or bearing; generally, said shockproof and vibration-damping units comprise a plurality of vibration and/or shock absorbers, which of course are precalculated.

FIG. 4 is a diagram showing the transmissability or transmission capability, by which by mere way of example the decrease in resonance frequency will be seen as the distance or spacing d between the mounting bars increases versus the increased size of the helix or spiral, under the same carried weight or load and diameter of the cable.

FIG. 5 is a diagrammatic perspective view showing the device for the production of a metal cable of the helix or spiral type. Such a device is composed of three main parts, and particularly: any rotating system 10, such as a geared motor, lathe and the like; a mandrel or spindle comprising two juxtaposed parallel portions 15 and 17 of such dimensions and gauge as to allow the production thereon of spirals of metal cable with precalculated diameters and lengths in accordance with the diameter of the cable and pitch of the turns to be accomodated within seats 2c of pairs of bars 2a and 2b which are secured together to clamp the cable for a section thereof which is from two to four times as long as the diameter of said cable; a braking system 12, holding the in-coming cable 3a and sliding on two stationary or fixed shafts 13 and 13' so as to perform the winding operation according to the pitch as predetermined by the center to center of the notches 2c of the pair of bars 2a, which will be secured on the fixed body 15 of said mandrel or spindle.

FIG. 6 is an enlarged side view of the mandrel or spindle 15, 17 shown in FIG. 5, which is secured by means of tang 14 to said rotating system 10. Such a mandrel or spindle is composed of a main part 15, the length, thickness and radius of curvature of which are calculated according to the types of mountings to be provided, having on two diametrical zones or regions a portion of flat surface 15', on each of which a bar 2a is placed and secured to the mandrel or spindle body 15 by means of screws passing through said threaded holes 7 (FIG. 1); the other movable semicylindrical portion 17 peripherally having the same radius of curvature as that of said main part 15, has a pin or stake 18 guided by the inner contour of a cam slot 18' and a clamping spacer means 19, enabling part 15' to move parallel to or away from the mandrel or spindle part 15, so as to allow for the withdrawal or removal of the finished mounting by release of said spacer means 19 and slide in said slot 18'. A clamp 20 will serve for fastening the cable end at the start of the cable winding on the mandrel or spindle for the spiral formation.

FIG. 7 shows the same side view as that of FIG. 6, but with the movable part 17 of the mandrel or spindle approached to the stationary part 15 by removal of the clamping spacer means 19, so that the mandrel or spindle diameter can be reduced and accordingly the finished mounting can be unthreaded, after securing the bars 2b on the respective bars 2a by means of said screws 5 for mounting completion, and after removing said screws 7 and loosening said clamp 20, clamping the first end of the cable, thus obtaining the complete self-contained mounting, by first cutting the cable at the final portion.

FIG. 8 is a side view showing the mandrel or spindle 15, 17 with the insertion of the initial blocking clamp 20 for cable 3a, as well as said tang 14 for the fastening of the mandrel or spindle to the rotating body 10, whereas the parts 2a of the bar pairs secured on the opposite flat parts 15' of the mandrel or spindle portion 15 will determine the helix pitch by means of said notches 2c.

FIG. 9 is a front sectional view showing the mandrel or spindle 15, 17 with the insertion of the clamping system 19, holding the semi-cylindrical portion 17 spaced apart, so as to allow the winding up to measure of the helix or spiral which, at the free portion of the cable, will take the precalculated radius of curvature R on the two semi-cylindrical portions of said mandrel or spindle 15,17, as well as the bars 2a secured to the flat portion 15' of mandrel or spindle 15. In cross-section, to movable portion 17 of the mandrel or spindle is as a semi-cylinder somewhat smaller than mandrel or spindle 15, since said flat or planar surfaces 15' are formed and longitudinally arranged on the latter for the fastening of said bars 2a as the mounting helix or spiral is being made.

The description of the device for safe and fast manufacture of the vibration-damping and shockproof mounting according to the invention, has pointed out the novel characteristics of the process that have to be effected in order to provide the novel vibration-damping mounting, the novel characteristic of which consists of providing at least one metal cable, the turns of which are clamped under tension between at least two pairs of stabilizing bars 2a and 2b, provided with precalculated semi-cylindrical transverse seats 2c to immobilize the cable by centripetally compressing it, practically at right angles to the axis of the turn forming mandrel or spindle, and this without any distortion to the elementary wires making up such a cable.

Having established by precalculation the type of mounting formed of turns of metal cable suited for resolving a certain problem of absorption or insulation from vibration and shocks and having accordingly determined the cable diameter as well as the radius of curvature R for the free portions of the cable in the mounting and the distance or spacing d (see FIG. 3') between the pairs of bars, according to the required calculated deflection, the selection is made for the mandrel or spindle formed of two longitudinal halves 15 and 17, which peripherally will have the same radius of curvature R; additionally, the bars 2a will be secured on the flat longitudinal strips 15' opposite to that of the mandrel or spindle portions 15 (FIGS. 5 and 8) by screws passing through said holes 7 (FIG. 1). Such pair of bars 2a has spaced apart transverse notches of such a width and length as to constitute a seat for half of the precalculated metal cable and has a center to center between said notches 2c as to constitute the pitch for the helix or spiral to be made. The mandrel or spindle, the tang 14 of which is connected to a rotating system, is presented in its open form (FIG. 6), that is to say with said spacer 19 inserted by means of screws 19' (FIG. 9), so as to retain the movable portion 17 separated from the stationary portion 15 of the mandrel or spindle, by sliding and translation on pin 18 by means of slot 18'. At such a position, the mandrel or spindle is correctly symmetrical with the two radiuses of curvature R and ready to use. Now, the terminal of the metal cable having precalculated diameter is passed through the cylinder 12, provided with a braking system restraining against cable sliding (FIG. 5), while being secured to a support capable of moving by sliding on two stationary shafts 13 and 13'. The cable terminal is blocked in said clamp 20 (FIGS. 6 and 8) and, by driving said rotating system 10, the winding of the cable on said mandrel or spindle 15, 17 is started, holding the braking system 12 under tension, so that said cable 3a can be distributed in the notches 2c of bars 2a (FIG. 5). At the end of the winding up operation, the screws are removed from the holes 7 for temporary fastening of bars 2a to the mandrel, and the other bars 2b identical to the former, are superimposed to said bars 2a, by clamping with screws 6 passing in said threaded holes 5 (FIG. 1). Each of the bar pairs 2a and 2b are clamped to one another, compressing said cable 3a, which remains at blocked condition, but taking care that its elementary wires should never be distorted nor choked at the outlet of seats 2c, the dimensions of which are precalculated to provide the desired result. Now, the clamp 20 is released at the beginning of the mandrel clamping the terminal of the metal cable, the screws of the spacer means 19 are unscrewed, and with a blow the movable portion 17 of the mandrel is caused to slide in said slot 18', so as to take the position as shown in FIG. 7.

After cutting the length of metal cable 3a emerging from the braking cylinder 12, and before the final fastening in the last pair of bars 2a and 2b, the finished mounting may be removed from the mandrel 15, 17 and is ready for assembling at the site of use for performing its vibration-damping and shockproof function.

What I claim is:

1. A device for forming a vibration-damping and shockproof element having at least one helical coil made from a multistrand wire cable, said device comprising rotary generating means for rotatably powering adjustable mandrel means, said mandrel means including first and second juxtaposed parallel longitudinal elements having a substantially semicylindrical configuration, said first longitudinal element being substantially stationary and said second longitudinal element being movable with respect to said first element to vary the radius of curvature of said mandrel means, said first longitudinal element including a pair of opposed parallel planar zone means for releasably securing a portion of said vibration damping and shockproof element during the formation of said coil; said pair of opposed parallel planar zone means comprising a pair of substantially flap planar strips oriented parallel to the longitudinal axis of said first element including a plurality of threaded holes positioned to correspond to threaded holes in said portion of said vibration-damping and shockproof element and said portion of said vibration-damping and shockproof element comprising a pair of longitudinal bars having on the face thereof opposite said mandrel means a plurality of semicylindrical seats for receiving said cable; releasable spacer means for movably separating said second longitudinal element from said first longitudinal element and maintaining said first and second longitudinal elements in spaced relationship, said spacer means being variably adjustable to move said movable second longitudinal element with respect to said stationary first longitudinal element to vary the radius of curvature of said mandrel means, thereby varying the diameter of said helical coil formed on said mandrel means, and said spacer means being releasable to cause said second longitudinal element to move toward said first longitudinal element resulting in said mandrel means having a smaller diameter than said coil so that said vibration damping and shockproof element can be easily removed from said mandrel means; cam means cooperating with said spacer means for movably maintaining said movable second longitudinal element in spaced apart relationship to said stationary first longitudinal element to adjust the tension of said coil being formed, wherein said cam means operates to displace said movable second longitudinal element parallel to its own axis and includes a slot having a generally reverse L-shaped configuration and a pin guided for movement by the configuration of said slot to change the position of said stationary longitudinal element; clamp means mounted on said mandrel means for securing one end of said cable during the formation of said helical coil, and cable feed means for controllably feeding said cable under tension to said mandrel means.

2. A process for producing a vibration damping and shockproof element having at least one helical coil formed from a multistrand wire cable supported by and enclosed within opposed longitudinal members parallel to the axis of said coil, comprising the steps of determining the optimum diameter of said coil, adjusting the movable element of a rotating mandrel to produce a radius of curvature in the mandrel corresponding to said diameter, releasably securing to the outer surface of said mandrel a pair of opposed parallel bars having a plurality of seats shaped to receive said cable and orient said cable in a desired direction and spaced to maintain the spacing of the turns of said coil, rotating said mandrel at low speed, clamping one end of said cable to said rotating mandrel, feeding said cable under tension to said rotating mandrel, winding said cable longitudinally around said rotating mandrel to engage said cable in said seats during winding, thereby producing a helical coil of cable having the desired orientation and spacing, securing to said first pair of bars a second pair of opposed parallel bars complementary to said first pair to clamp said cable therebetween without deforming the elementary wires of said cable, releasing said one clamped end of said cable, cutting said cable at a point after said cable has engaged all of said seats in said pair of bars, releasing said opposed parallel bars from said mandrel, causing said movable element of said mandrel to be released and move inwardly of said coil to reduce the radius of curvature of said mandrel so that the finished vibration-damping and shockproof element can be easily removed from said mandrel.

3. The process described in claim 2, wherein the seats of said parallel longitudinal bars are oriented to produce a helical coil having a right-hand portion contiguous with a left-hand portion.

4. The process described in claim 3, wherein the seats of said parallel longitudinal bars are oriented to produce a helical core having an alternate sequence of right-hand and left-hand turns.

* * * * *